July 9, 1957 R. E. GRAHAM 2,798,905
WIDE BAND AMPLIFIER USING POSITIVE FEEDBACK
Filed Oct. 12, 1953 2 Sheets-Sheet 1
FIG. 1
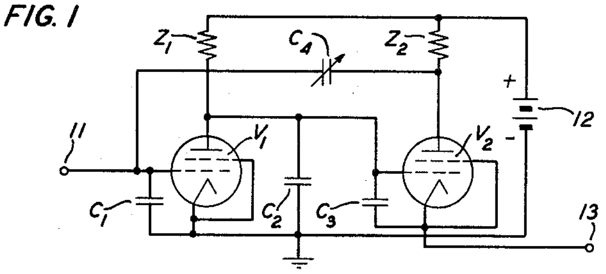
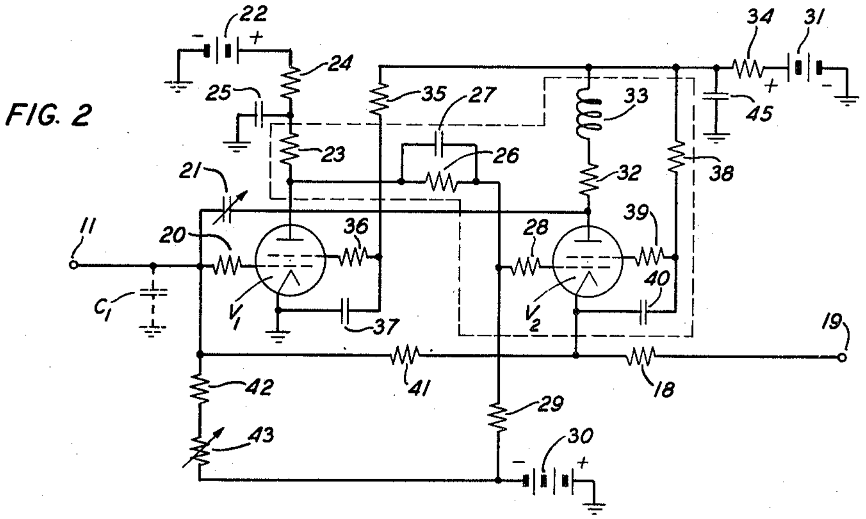
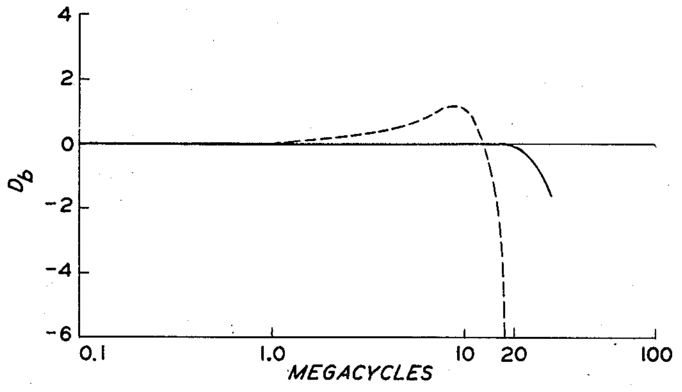
INVENTOR
R. E. GRAHAM
BY Hugh S. Wertz
ATTORNEY July 9, 1957 R. E. GRAHAM 2,798,905

WIDE BAND AMPLIFIER USING POSITIVE FEEDBACK

Filed Oct. 12, 1953 2 Sheets-Sheet 2

INVENTOR
R. E. GRAHAM
BY Hugh S. Wertz
ATTORNEY

United States Patent Office 2,798,905

Patented July 9, 1957

2,798,905

WIDE BAND AMPLIFIER USING POSITIVE FEEDBACK

Robert E. Graham, Chatham Township, Morris County, N. J., assignor to Bell Telephone Laboratories, Incorporated, New York, N. Y., a corporation of New York Application October 12, 1953, Serial No. 385,569

5 Claims. (Cl. 179—171)

This invention relates to amplifiers and more particularly to amplifiers utilizing positive feedback circuits.

Positive feedback principles have long been used in amplifiers for many purposes such as effecting zero impedance at the output of an amplifier and for frequency compensation. However, these principles have not proved to be readily adaptable as means for broadening the bandwidth of the gain characteristic of an amplifier. The difficulty is due primarily to the fact that many possible positive feedback configurations tend to be unstable in use and otherwise difficult to control.

An object of this invention is to provide a stable positive feedback amplifier having a broad-band gain characteristic.

A further object of the invention is to provide a positive feedback amplifier having a broad-band gain characteristic and a zero output impedance.

The present invention is based on the discovery that in an amplifier having a cathode follower output circuit a positive feedback arrangement will produce a substantial increase in amplifier bandwidth if an impedance of the circuit is such that when the cathode of the output circuit tube is shorted to ground the positive feedback gain is unity. It is understood that shorting the cathode to ground is an artificial reference condition for the circuit and the amplifier in that condition is non-operating. However, in an operating positive feedback amplifier having a feedback monitoring impedance selected in accordance with the above-described condition, the output circuit thereof becomes effectively an ideal cathode follower (having infinite trans-conductance) so that the normal interstage capacity between the amplifier stage and cathode follower stage is greatly reduced. It is this reduction in interstage capacity which causes the bandwidth of the amplifier to be increased substantially. An additional benefit of this amplifier arrangement is that the output impedance thereof is substantially zero. Hence, it is readily possible to match the output impedance of the amplifier to the impedance of the load.

The invention contemplates a feedback amplifier having an amplification stage and a cathode-follower output stage. The output stage comprises, in part an electron tube including an anode, a cathode, and a control grid, the latter element being connected to the output of the amplification stage. The anode is connected to a source of direct current through a small load impedance and also to the input of the amplification stage, the latter connection comprising a positive feedback circuit. This anode load impedance is selected so that the circuit feedback gain is unity when the cathode is grounded, thereby making the output impedance of the amplifier substantially zero under actual operating conditions and the gain characteristic stable over a broad frequency band.

The unity feedback gain condition just described suggests an amplifier that may be unstable over even a narrow frequency band. However, stability is made possible by the fact that with the amplifier in actual operating condition (i. e. the output terminal not shorted to ground) the feedback gain will tend to be reduced from the unity value by cathode degeneration in the output stage.

A feature which may be included in the amplifier of the invention to further increase the bandwidth thereof is a guard ring which directs a part of the remaining stray interstage capacitance to the cathode of the ideal cathode follower thereby further reducing the effect of the stray interstage capacitance upon the amplifier response.

A further feature which may be included to improve the stability of the amplifier is a negative feedback circuit which suppresses losses due to shunt capacitances at the input terminal, and provides the usual benefits of linearity and gain constancy. In addition, the presence of the negative feedback aids in controlling or stabilizing the positive feedback.

The invention, its objects and features will be better understood by referring to the following descriptions and drawings forming a part thereof, wherein:

Fig. 1 is a schematic diagram of a simplified amplifier embodying the principles of the invention;

Fig. 2 is a schematic diagram of an amplifier produced in practice embodying the principles of the invention;

Fig. 3 is a gain frequency response curve for the output of the amplifier of Fig. 2.

Figure 4:
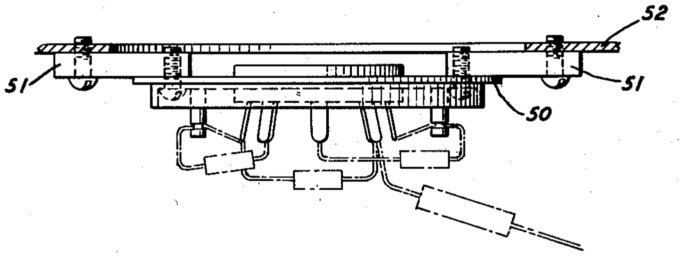
Figs. 4 and 5 are illustrations of the guard ring mounting technique.

Referring particularly to Fig. 1, there is shown for purposes of illustrating the operating principles thereof, a two-tube adaptation of an amplifier in accordance with the invention wherein common means suitable for maintaining a difference in potential between the two tubes is not shown, for simplicity, in the drawing. There is a single amplification stage including tube $V_1$ shown followed by a cathode follower stage including tube $V_2$. This combination has a single polarity reversal making it particularly adapted for converting negative signal currents, such as are obtained from flying spot scanners and image-dissector tubes, into positive output voltages. The tubes $V_1$ and $V_2$ each include an anode, a cathode, and at least one grid. Input signal current applied to the control grid of tube $V_1$ through terminal 11 is partially shunted to ground by the capacitor $C_1$ which represents the total shunt capacity to ground of the input circuit. The amplified and reversed polarity signal appears at the anode of $V_1$ and is applied to the control grid of tube $V_2$. The anode of $V_1$ is also connected to the positive terminal of a direct current source 12 through load impedance $Z_1$. In the interstage circuit, capacitor $C_2$ represents the stray shunt capacitance directly to ground and the capacitor $C_3$ represents the grid to cathode capacitance of tube $V_2$. The anode of $V_1$ is also connected to the positive terminal of source 12 through impedance $Z_2$ and to the input terminal 11 through a variable capacitor $C_4$. The latter connection constitutes the positive feedback part of the circuit. The output of the amplifier circuit is taken from the cathode of $V_2$ through terminal 13. The load impedance $Z_2$ inserted into the plate return of tube $V_2$ is made sufficiently small to avoid any direct effect on the response of tube $V_2$ and also to permit a free choice in specifying the impedance-versus-frequency characteristic of $Z_2$, independent of parasitic capacities. The signal developed across impedance $Z_2$ is fed back to the electrode 11 through a small capacitor $C_4$ which is chosen to be small as compared to capacitance $C_1$ in order to avoid any appreciable increase in the input capacity. It has been found that the bandwidth of the amplifier will be increased if the impedance $Z_2$ is adjusted to provide unity gain around the feedback loop for the artificial reference condition where the terminal 13 is shorted to ground.

Under these conditions the gain, $\mu\beta$, around the feedback loop is found to be:

$$\mu\beta = \frac{G_1}{Y_1+Y_2} \cdot G_2 Z_2 \cdot \frac{C_4}{C_1} \quad (1)$$

where $G_1$ and $G_2$ are the transconductances of tubes $V_1$ and $V_2$ respectively, and $Y_1$ and $Y_2$ are the direct admittances from the anode of $V_1$ to ground and from the anode of $V_1$ to the terminal 13 respectively. For the condition where the gain is unity the load impedance $Z_2$ may be expressed as $$Z_2 = \frac{C_1}{G_1 G_2 C_4} \cdot (Y_1+Y_2) \quad (2)$$

where, as shown in Fig. 1, $Y_1$ is taken to be a simple conductance $g_1$ and a capacity $C_2$ connected in parallel, i. e.

$$Y_1 = g_1 + C_2 p \quad (3)$$

where $p=j\omega$, and $Y_2$ is taken to be a capacity susceptance $$Y_2 = C_3 p \quad (4)$$

then the impedance $Z_2$ becomes a series connected resistance $R_2$ and inductance $L_2$. In this case, the expressions for $R_2$ and $L_2$ are:

$$R_2 = \frac{g_1 C_1}{G_1 G_2 C_4} \quad (5)$$

and $$L_2 = \frac{C_1(C_2+C_3)}{G_1 G_2 C_4} \quad (6)$$

With the constants of the circuits thus established, the overall transfer ratio of the circuit (the ratio of the voltage output to the current input) may be investigated. The expression for the transfer ratio is found to be substantially equal to that of an equivalent circuit without feedback, in which $V_2$ is a perfect tube (i. e., a tube having infinite transconductance) thereby permitting it to act as an ideal cathode follower. Under these conditions, the potential difference between the grid of tube $V_2$ and terminal 13 vanishes and the grid-cathode capacity $C_3$ no longer has any effect whatsoever. The total apparent interstage capacity under this condition is considerably reduced from the ordinary value, which would include the capacity $C_3$, to a value that includes merely the stray capacitance $C_2$ from the anode $V_1$ directly to ground. It is this reduction in effective interstage capacity that makes possible a substantial increase in the bandwidth of the amplifier response characteristic.

The equivalent circuit interpretation described above holds true for both the gain-frequency response characteristic and the output impedance characteristic of the amplifier. With the above-described arrangement, it is found that the impedance seen at the output terminal 13 is negligible over a broad frequency band thereby eliminating any output impedance matching problem that may be associated with this circuit. That is, any desired value of matching impedance may simply be inserted in the output load. Thus, we have substantially increased the bandwith of an amplifier and virtually eliminated any output impedance matching problem both through the use of a positive feedback circuit.

The invention as actually used in practice is shown in the circuit of Fig. 2. In Fig. 2 there is shown a two-tube embodiment of the invention in which tube $V_1$ is in the amplification stage and tube $V_2$ is in the cathode follower stage. The input current is fed from terminal 11 to the control grid of $V_1$ through a coupling resistor 20. Terminal 11 is shunted to ground by stray coupling capacitances here represented in dashed lines by capacitor $C_1$. The anode of $V_1$ is connected to source 22 through a load resistor 23, and a resistor 24 which forms part of a decoupling network including capacitor 25 connected between the junction of the resistors to ground. In addition, the anode is connected to the control grid of $V_2$ through a parallel connected resistor and capacitor 26 and 27, respectively, and an anti-sing resistor 28. Grid bias resistor 29 connects source 30 to the junction point of the parallel resistor 26 and capacitor 27 arrangement and resistor 28. The anode of $V_2$ is connected to a source 31 through the series resistor and inductor, 32 and 33 respectively, and through resistor 34. The series resistor and inductor means including 32 and 33 is representative of impedance $Z_2$ of Fig. 1. The anode of $V_2$ is also connected to terminal 11 through a variable capacitor 21 which represents the capacitor $C_4$ of Fig. 1. This connection is the positive feedback arrangement. The junction of inductor 33 and resistor 34 is connected to the screen grid of tube $V_1$ through resistors 35 and 36, this latter junction being connected to the cathode of $V_1$ through bypass capacitor 37, which cathode is in turn connected to ground. Current from source 31 is fed to the screen grid of $V_2$ through a similar connection comprising resistors 38 and 39. The junction of resistors 38 and 39 is connected to the cathode of $V_2$ through capacitor 40. The circuit of Fig. 2 as thus far described functions in a manner similar to that of Fig. 1 where the amplified signal is fed from the anode of $V_1$ to the grid of $V_2$, the signal from the load impedance formed by resistor 32 and inductor 33 is fed back through the positive feedback circuit including capacitance 21 to the grid of $V_1$, and the output response at the cathode of $V_2$ is constant over a broad frequency range and the output impedance at that point is substantially zero.

Also included in the amplifier circuit of Fig. 2 is a negative feedback circuit including resistor 41, a grid bias control circuit from source 30 for tube $V_1$ including resistors 42 and 43, and an output termination resistor 18 selected to match the impedance of the load connected to terminal 19. In addition a bypass capacitor 45 is connected between ground potential and the junction of inductor 33 and resistor 34.

In the negative feedback circuit the resistor 41 is made large in order to reduce the low frequency noise generated in $V_1$, relative to the desired signal. However, the shunt capacitance of the coupling circuit represented here as in Fig. 1 by capacitor $C_1$ together with the resistor 41 comprise an input lead impedance having a large time constant which tends to cause the output signal to be greatly attenuated at high frequencies. By making the amount of negative feedback substantial, the effect of the input shunt capacity is confined to the loop gain characteristic and does not appear in the overall transfer ratio of the amplifier. Due to this arrangement the initial load time constant is suppressed thereby alleviating the resultant tendency towards high frequency loss. One of the principal advantages of this arrangement is that it is adapted for use with input sources such as the iconoscope camera tube where the effective time-constant varies with variations in the incident light. In addition, the negative feedback arrangement provides the usual stability to the circuit, and also makes an important contribution in reducing the output impedance seen at the cathode of $V_2$ at frequencies so low that the positive feedback is inadequate for these purposes.

Figure 5:
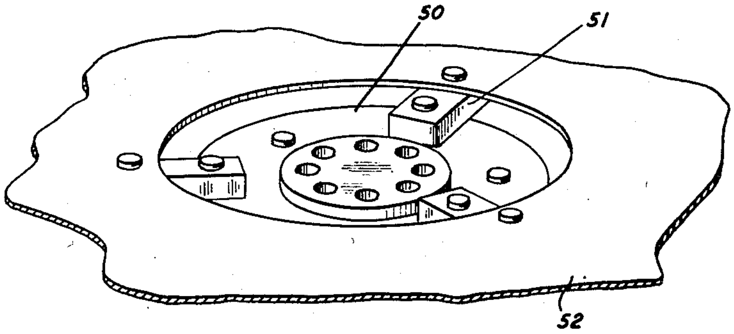

The fact that the positive feedback arrangement makes the amplifier circuit indifferent to the grid cathode capacity of tube $V_2$ may be used to the further advantage of the circuit. By using a guard ring mounting technique as shown in Figs. 4 and 5 for the various interstage components, the interstage circuit can be made to exhibit a large part of its stray capacity to the output cathode rather than to ground potential. Thus, the stray capacitance of the interstage network does not materially influence the operation of the amplifier. This effect is achieved by mounting $V_2$ on a metal disc 50 separated by insulating blocks 51 from the circuit mounting base 52, connecting the output cathode to the disc, and mounting the interstage components well within the electrostatic aura of the disc. The elements so mounted on the ring are included in the area enclosed by the dashed line in Fig. 2.

The response characteristic of this improved amplifier is shown in Fig. 3. The solid line shows that for the amplifier in accordance with the invention having positive and negative feedback the gain-frequency response curve is flat to within 0.1 decibel from zero frequency to 20 megacycles. The dashed line shows that without positive feedback, the amplifier has comparable characteristics over a much narrower frequency range.

The advantages of the circuit arrangement of Fig. 2 are many. The positive feedback circuit provides a substantially zero output impedance and also makes the amplifier circuit independent of the grid-cathode capacitance of the cathode follower tube. The circuit independence to the grid-cathode capacitance reduces the stray interstage capacity and thereby increases the frequency band of the amplifier response characteristic. An additional advantage is realized by the inclusion of a guard ring in that the effective interstage capacitance of the amplifier circuit is further reduced and the frequency band of the response characteristic is increased. The addition of a negative feedback circuit not only increases the linearity of the circuit and adds stability to the circuit over a broad frequency range but it also suppresses the high frequency loss due to the input coupling capacity.

While there are a number of possible values suitable for use in the circuit elements, values used in an operable embodiment of the amplifier of Fig. 2 (in which the input capacity $C_1$ is taken as 36 micro-microfarads and the impedance of the load as 75 ohms) and which are reproduced below merely by way of example are:

| | | |
|---|---|---|
| 18 | ohms | 75 |
| 20 | do | 10 |
| 21 | micro-microfarads | 4 |
| 22 | volts | +300 |
| 23 | ohms | 1500 |
| 24 | do | 3300 |
| 25 | micro-microfarads | 360 |
| 26 | ohms | 150,000 |
| 27 | micro-microfarads | 470 |
| 28 | ohms | 10 |
| 29 | do | 290,000 |
| 30 | volts | −300 |
| 31 | do | +150 |
| 32 | ohms | 1.5 |
| 33 | micro-henrys | 0.2 |
| 34 | ohms | 1 |
| 35 | do | 100 |
| 36 | do | 39 |
| 37 | micro-microfarads | 1000 |
| 38 | ohms | 1600 |
| 39 | do | 39 |
| 40 | micro-microfarads | 1000 |
| 41 | ohms | 10,000 |
| 42 | do | 390,000 |
| 43 | do | 200,000 |
| 45 | microfarads | 30 |

It is understood that the above-described embodiment is merely illustrative of the principles of the invention. Numerous other arrangements might be devised by those skilled in the art without departing from the spirit and scope of the invention.

What is claimed is:

1. In combination, an amplifier and an output coupling circuit of the cathode follower type comprising an electron discharge device including an anode, a cathode and a control grid, means for connecting the output of said amplifier to said grid, means connected between said anode and the input of said amplifier for providing positive feedback to said amplifier, means connected between said cathode and the input of said amplifier to provide negative feedback thereto, a source of direct current having a positive terminal and a negative terminal, and reactive impedance means for connecting said anode to said positive terminal, said impedance means being selected so that the feedback gain is substantially unity when said cathode is connected to said negative terminal.

2. An amplifier circuit comprising an amplification stage and a cathode-follower stage, said cathode-follower stage including an electron discharge device having an anode, a cathode and a control grid, means for connecting the output of said amplification stage to said grid, means including a capacitor connected between said anode and the input of said amplification stage for providing positive feedback thereto, means including a resistor connected between said cathode and the input of said amplification stage to provide negative feedback thereto, a source of direct current having a positive terminal and a negative terminal, and impedance means for connecting said anode to said positive terminal, said impedance means including a resistor and an inductor connected in series and selected so that the feedback gain of said amplifier circuit is unity when said cathode is connected to said negative terminal whereby the gain-frequency response characteristic of said amplifier is stable over a broad frequency band.

3. An amplifier circuit comprising an amplification stage and a cathode follower stage, said cathode-follower stage including an electron discharge device having an anode, a cathode and a control grid, means for connecting the output of said amplification stage to said grid, said means including an interstage network having associated therewith stray capacitance, means including a capacitor connected between said anode and the input to said amplification stage to provide positive feedback thereto, means including a resistor connected between said cathode and the input of said amplification stage to provide negative feedback thereto, a source of direct current having a positive terminal and a negative terminal, impedance means for connecting said anode to said positive terminal, said impedance means including a resistor and an inductor connected in series and selected so that the feedback gain of said amplifier circuit is unity when said cathode is connected to said negative terminal whereby the output of the amplifier is made independent of the grid-cathode capacitance of said device, and a guard ring disc having mounted thereon said impedance means, said interstage network and said cathode follower stage, said ring being connected to the cathode whereby the amplifier circuit is made substantially independent of the stray capacitance of said interstage network whereby the gain response characteristic of said amplifier is stable over a broad band of frequencies.

4. An amplifier circuit comprising an amplification stage, a cathode follower output stage connected thereto, said cathode follower stage including an electron discharge device having an anode, a cathode, and a control grid, means for connecting the output of said amplification stage to said grid, said means including an interstage network having associated therewith stray capacitance, positive feedback means connected between said anode and the input of said amplifier, said feedback means having an impedance such that the feedback gain thereof is unity when the cathode of said cathode follower stage is connected to a reference potential, and a guard ring disk having mounted thereon said interstage network and said cathode follower stage, said ring being connected to the cathode whereby the amplifier circuit is made substantially independent of the stray capacitance of said interstage network, whereby the gain characteristic of said amplifier is made stable over a broad frequency band.

5. An amplifier circuit comprising an amplification stage and a cathode follower stage, said cathode follower stage including an electron discharge device having an anode, a cathode and a control grid, means for connecting the output of said amplification stage to said grid, means connected between said anode and the input of said amplification stage for providing positive current feedback thereto, means connected between said cathode and the input of said amplification stage to provide negative feedback thereto, said positive feedback means being so adjusted that the feedback gain is unity when the cathode of said follower stage is connected to zero voltage potential whereby the gain-frequency response characteristic of said amplifier is stable over a broad frequency band.

References Cited in the file of this patent

UNITED STATES PATENTS

| | | |
|---|---|---|
| 2,359,504 | Baldwin | Oct. 3, 1944 |
| 2,581,456 | Swift | Jan. 8, 1952 |